(12) United States Patent
Beckwith (10) Patent No.: US 11,496,297 B1
(45) Date of Patent: Nov. 8, 2022

(54) LOW FOOTPRINT RESOURCE SHARING HARDWARE ARCHITECTURE FOR CRYSTALS-DILITHIUM AND CRYSTALS-KYBER

(71) Applicant: PQSecure Technologies, LLC, Boca Raton, FL (US)

(72) Inventor: Luke Beckwith, Boca Raton, FL (US)

(73) Assignee: PQSecure Technologies, LLC, Boca Raton, FL (US)

( * ) Notice: Subject to any disclaimer, the term of this patent is extended or adjusted under 35 U.S.C. 154(b) by 0 days.

(21) Appl. No.: 17/641,869

(22) PCT Filed: Jun. 10, 2021

(86) PCT No.: PCT/US2021/036785
§ 371 (c)(1),
(2) Date: Mar. 10, 2022

(51) Int. Cl.
*H04L 9/08* (2006.01)

(52) U.S. Cl.
CPC .................................. *H04L 9/0852* (2013.01)

(58) Field of Classification Search
CPC .................................................... H04L 9/0852
See application file for complete search history.

(56) References Cited

U.S. PATENT DOCUMENTS

| 11,249,726 B2* | 2/2022 | Langhammer | G06F 7/49947 |
| 2019/0312728 A1* | 10/2019 | Poeppelmann | H04L 9/3093 |
| 2020/0259649 A1* | 8/2020 | Garcia Morchon | H04L 9/0819 |
| 2020/0265167 A1* | 8/2020 | Banerjee | G06F 7/724 |
| 2020/0313886 A1* | 10/2020 | Poeppelmann | H04L 9/3236 |

(Continued)

FOREIGN PATENT DOCUMENTS

| GB | 2480261 A | 11/2011 | |
| WO | WO-2021032946 A1 * | 2/2021 | G06F 21/123 |

(Continued)

OTHER PUBLICATIONS

Bisheh-Niasar M, Azarderakhsh R, Mozaffari-Kermani M. High-speed NTT-based polynomial multiplication accelerator for CRYSTALS-Kyber post-quantum cryptography. Cryptology ePrint Archive. May 3, 2021. (Year: 2021).*

(Continued)

*Primary Examiner* — James R Turchen
(74) *Attorney, Agent, or Firm* — Mark C. Johnson; Johnson Dalal (57) ABSTRACT

A low footprint resource sharing hardware architecture that is implemented as a co-processor and is operably configured to perform a plurality of cryptographic algorithms for Dilithium-DSA at all NIST-recommended post-quantum cryptography security levels and a plurality of cryptographic algorithms for Kyber-KEM at all NIST-recommended post-quantum cryptography security levels. The architecture also includes a singular arithmetic unit 104 operably configured perform all arithmetic operations required in the plurality of cryptographic algorithms for Kyber-KEM and the plurality of cryptographic algorithms for Dilithium-DSA and a singular sampling unit operably configured to sample all vectors and matrices required in the plurality of cryptographic algorithms for Kyber-KEM and the plurality of cryptographic algorithms for Dilithium-DSA.

14 Claims, 8 Drawing Sheets

(56) References Cited

U.S. PATENT DOCUMENTS

2021/0083862 A1    3/2021  Pointcheval et al.
2022/0171885 A1*   6/2022  Saarinen .............. G06F 21/72

FOREIGN PATENT DOCUMENTS

WO    WO-2021240157 A1 * 12/2021
WO    WO-2021252294 A1 * 12/2021

OTHER PUBLICATIONS

Avanzi R, Bos J, Ducas L, Kiltz E, LepointT, Lyubashevsky V, Schanck JM, Schwabe P, Seiler G, Stehlé D. CRYSTALS-Kyber algorithm specifications and supporting documentation. NIST PQC Round. 2020. (Year: 2020).*

Ebrahimi S, Bayat-Sarmadi S, Mosanaei-Boorani H. Post-quantum cryptoprocessors optimized for edge and resource-constrained devices in IoT. IEEE Internet of Things Journal. Mar. 5, 2019;6(3):5500-7. (Year: 2019).*

Banerjee et al. "Sapphire: A Configuarable Crypto-Processor for Post-Quantum Lattice-based Protocols." [Oct. 25, 2019] < URL: https://andv.org/abs/1910.07557 >.

* cited by examiner

LOW FOOTPRINT RESOURCE SHARING HARDWARE ARCHITECTURE FOR CRYSTALS-DILITHIUM AND CRYSTALS-KYBER

FIELD OF THE INVENTION

The present invention relates generally to the hardware architecture of lattice-based post-quantum cryptographic algorithms. In particular, to the Cryptographic Suite for Algebraic Lattices (CRYSTALS), composed of the Kyber Key Encapsulation Mechanism (KEM) and the Dilithium Digital Signature Algorithm (DSA).

BACKGROUND OF THE INVENTION

With the increasing applications of lightweight processors to Internet of Things (IoT) systems, there is a growing need for inexpensive and efficient cryptographic algorithm implementation. Additionally, quantum computers are threatening current asymmetric cryptographic standards such as RSA and ECC. These algorithms can be used directly for public key encryption or can be modified to support digital signatures such as the ECDSA algorithm. To date, these algorithms have been used to provide vital cryptographic services such as data confidentiality, integrity, and authentication. However, these algorithms will no longer be viable once quantum computer reach a large enough scale.

To meet the need, efficient and secure implementations of quantum secure algorithms, known as post quantum cryptography, must be created. Kyber-KEM and Dilithium-DSA are a pair of cryptographic algorithms which enable key exchanges and digital signatures based on the Module Learning with Errors (MLWE) problem. These algorithms remain resilient against both quantum and classical attacks. While these algorithms have different applications, their similar mathematical basis means they employ similar operations to perform their various algorithms. To date, there is no work which employs a combined hardware architecture to implement the entirety of the Kyber KEM and Dilithium DSA algorithms. Merging both algorithms into a single hardware provide substantial benefits for low-cost applications such as IoT devices.

SUMMARY OF THE INVENTION

The invention provides a full hardware architecture for both algorithms in CRYSTALS, capable of performing the entirety of key generation, encapsulation, and decapsulation of Kyber-KEM at security levels 512, 768, and 1024, as well as key generation, signature generation, and signature verification for Dilithium-DSA at security level 2,3,5. These security levels meet the standards of the NIST recommended post quantum security levels. The architecture has its own control system and requires no external intervention during operation of the algorithms. The architecture can be thought of as having three types of data paths and hardware resources, i.e., those utilized only for operation required by Kyber-KEM, those utilized only for operation required by Dilithium-DSA, and those utilized by both algorithms. The spirit of the invention is to maximize the shared resources between the Kyber-KEM and Dilithium-DSA algorithms while minimizing the total resources consumed.

The architecture supports operations performed over the algebraic module use for version 3.0 of Kyber-KEM and the algebraic module used for version 3.1 of Dilithium-DSA. Said Kyber-KEM module is generated over the ring $R_q = \mathbb{Z}_q[X]/(X^n+1)$ where $q=3329$ and $n=256$. Elements of the module are vectors or matrices of element in $R_q$. In Kyber-KEM, both binomial sampling and uniform sampling are utilized for generating these module elements. Said Dilithium-DSA module is generated over the ring $R'_q = \mathbb{Z}_q[X]/(X^n+1)$ where $q=2^{23}-2^{13}+1$ and $n=256$. Elements of the module are vectors or matrices of element in $R'_q$. In Dilithium-DSA, only rejection sampling is used to generate elements in the module.

The invention performs the algorithms of Dilithium-DSA and Kyber-KEM by utilizing the following hardware systems: A FIFO module, a SHA3 coprocessor, two dual port RAM modules, a formatter module, a sampler module, a challenge sampler module, and an operator module. The shared controller module utilizes these systems to complete the cryptographic operations required for Kyber-KEM and Dilithium-DSA.

The FIFO module interfaces between the internal memory, formatter, and the external interface using the standard FIFO interface. The formatter packs and unpacks data from a packed stream of bytes to a stream of polynomial coefficients. It can be configured to perform encoding and decoding as defined in both the Dilithium-DSA and Kyber-KEM specifications and can optionally compress and decompress coefficients as described in Kyber-KEM. Additionally, it can center and de-center coefficients as required in Dilithium-DSA. There operations are done sequentially on a 16-bit data path for encoded data and a 23-bit data path for polynomial coefficients. A singular module is used for compression and decompression to reuse a singular multiplier, a singular encoder is used for encoding at all levels required for both Dilithium-DSA and Kyber-KEM, and a singular decoder is used for decoding at all levels required for both Dilithium-DSA and Kyber-KEM. Additionally, this module packs and unpacks the hint generated during Dilithium-DSA signature generation and signature verification.

The Operator module performs all arithmetic operation in both Kyber-KEM and Dilithium-DSA. This includes modular addition, modular subtraction, modular multiplication, the Cooley-Tukey butterfly, and the Gentlemen-Sande butterfly for modulus $q=8380417$ as required for Dilithium-DSA; decomposition for $2\gamma_2=190464$ and $2\gamma_2=523776$ as required for Dilithium-DSA; and modular addition, modular subtraction, modular multiplication, degree 1 polynomial multiplication, the Cooley-Tukey butterfly, and the Gentlemen-Sande butterfly for modulus $q=3329$ as required for Kyber-KEM. All operations are performed using a singular modular adder, a singular modular subtractor, and a singular modular multiplier for all operations at all modulus values. These low-level operations are utilized to perform: the full Number Theoretic Transform and its inverse for Dilithium-DSA, a partial full Number Theoretic Transform and its inverse for Kyber-KEM, point-wise matrix and vector multiplication, degree 1 polynomial matrix and vector multiplication, vector addition, vector subtraction, and vector decomposition.

The Challenge Sampler is utilized by the controller for Dilithium-DSA and generates the 256-coefficient polynomial c using a version of the Fisher-Yates shuffle as described in the Dilithium-DSAv3 specification.

The Sampler is used to generate all polynomials required in Dilithium-DSA and Kyber-KEM. This includes rejection sampling in ranges [0,8380417), [0,131072) [0,524288), [0,9), and [0,15) for Dilithium-DSA, as well as centering the samples around 0 when specified, it also includes rejection sample in the range [0,3329) and performing sampling from the centered binomial distribution for $\eta=2$ and $\eta=3$ as specified in Kyber. A SHA3 coprocessor is utilized by Dilithium-DSA for generating pseudorandom data and as a collision resistant hash through use of the SHAKE256 and SHAKE128 operation mode, and for Kyber-KEM as a hash function and for generating pseudorandom data using the SHA3-256, SHA3-512, SHAKE128, and SHAKE256 operation modes.

Throughout operation, a specialized instruction ordering is utilized to minimize the memory requirements of the architecture. The public matrix is never stored in memory but is instead generated on the fly and fed directly to the Operator during matrix multiplication. Additionally, no more than two vectors and one singular polynomial are stored in their unpacked form in memory at a time. When needed, vectors are encoded in to their packed for in between usage to reduce their memory consumption. Otherwise, vectors are only generated and unpacked when they are about to be used to complete an arithmetic operation.

With the foregoing and other objects in view, there is provided, in accordance with the invention, a low footprint resource sharing hardware architecture implemented as a co-processor and that is operably configured to perform a plurality of cryptographic algorithms for Dilithium-DSA at all NIST-recommended post-quantum cryptography security levels and a plurality of cryptographic algorithms for Kyber-KEM at all NIST-recommended post-quantum cryptography security levels and having a singular arithmetic unit operably configured perform all arithmetic operations required in the plurality of cryptographic algorithms for Kyber-KEM and the plurality of cryptographic algorithms for Dilithium-DSA and having a singular sampling unit operably configured to sample all vectors and matrices required in the plurality of cryptographic algorithms for Kyber-KEM and the plurality of cryptographic algorithms for Dilithium-DSA.

The proposed combined architecture consumes 30% logic elements than the equivalent independent architectures for Kyber-DSA and Dilithium-DSA while achieving equivalent performance. Additionally, the memory requirements are 19% lower for the combined architecture than the equivalent independent architectures for Kyber-DSA and Dilithium-DSA.

In accordance with another feature, an embodiment of the present invention includes the singular arithmetic unit having a singular hardware module operably configured to perform modular addition, modular subtraction, modular multiplication, degree 1 polynomial multiplication, a Cooley-Tukey butterfly operation, a Gentlemen-Sande butterfly operation, and a decomposition, as required, for both an algebraic module utilized in the plurality of cryptographic algorithms for Kyber-KEM and an algebraic module utilized in the plurality of cryptographic algorithms for Dilithium-DSA.

In accordance with yet another feature, an embodiment of the present invention also includes the singular arithmetic unit having a singular unified modular multiplier operably configured to perform modular multiplication for a modulus value of the plurality of cryptographic algorithms for Kyber-KEM, a modulus value of the plurality of cryptographic algorithms for Dilithium-DSA, and a decomposition for the all NIST-recommended post-quantum cryptography security levels of the plurality of cryptographic algorithms for Dilithium-DSA.

In accordance with a further feature of the present invention, the singular unified modular multiplier is operably configured to perform, within the singular unified modular multiplier, the modular multiplication and the decomposition for the all NIST-recommended post-quantum cryptography security levels of the plurality of cryptographic algorithms for Dilithium-DSA utilizing three multipliers, a singular right shift, and two subtractors.

In accordance with an additional feature, an embodiment of the present invention also includes an internal hardware controller having a specialized instruction ordering operably configured to minimize memory utilization within the architecture.

In accordance with another feature, an embodiment of the present invention also includes an internal hardware controller having a specialized instruction ordering operably configured to minimize a required memory range of a 16-bit RAM and a 23-bit RAM resident within the architecture.

In accordance with yet another feature, an embodiment of the present invention also includes an internal hardware controller operably configured to perform the plurality of cryptographic algorithms for Kyber-KEM and the plurality of cryptographic algorithms for Dilithium-DSA.

In accordance with a further feature, an embodiment of the present invention also includes a formatter having a singular encoder, a singular decoder, and a singular combined compression and decompression module operably configured to convert all polynomials, in the plurality of cryptographic algorithms for Kyber-KEM and in the plurality of cryptographic algorithms for Dilithium-DSA, between a packed form and an unpacked form.

In accordance with a further feature of the present invention, the singular encoder is operably configured to encode polynomial coefficients to a byte stream in the plurality of cryptographic algorithms for Dilithium-DSA at the all NIST-recommended post-quantum cryptography security levels and in the plurality of cryptographic algorithms for Kyber-KEM at the all NIST-recommended post-quantum cryptography security levels. Further, the singular decoder is operably configured to decode polynomial coefficients from a byte stream in the plurality of cryptographic algorithms for Dilithium-DSA at the all NIST-recommended post-quantum cryptography security levels and in the plurality of cryptographic algorithms for Kyber-KEM at the all NIST-recommended post-quantum cryptography security levels.

In accordance with yet another feature of the present invention, the singular sampling unit operably configured to perform binomial sampling and rejection sampling for the all NIST-recommended post-quantum cryptography security levels, as required, in the plurality of cryptographic algorithms for Dilithium-DSA and in the plurality of cryptographic algorithms for Kyber-KEM.

DETAILED DESCRIPTION

The present invention provides a novel hardware architecture for combining the operation required for Dilithium-DSA and Kyber-KEM into a singular hardware coprocessor. In one embodiment, Dilithium-DSA only does the authentication as discussed herein and Kyber-KEM only does the key exchange. The present invention provides modules and an order of instructions utilizing those modules to complete the plurality of algorithms in the Kyber-KEM cryptosystem at security levels 512, 768, and 1024 (which are currently all NIST-recommended post-quantum cryptography security levels) and to perform the plurality of algorithms in the Dilithium-DSA cryptosystem at security levels 2, 3, and 5 (which are currently all NIST-recommended post-quantum cryptography security levels).

Figure 1:
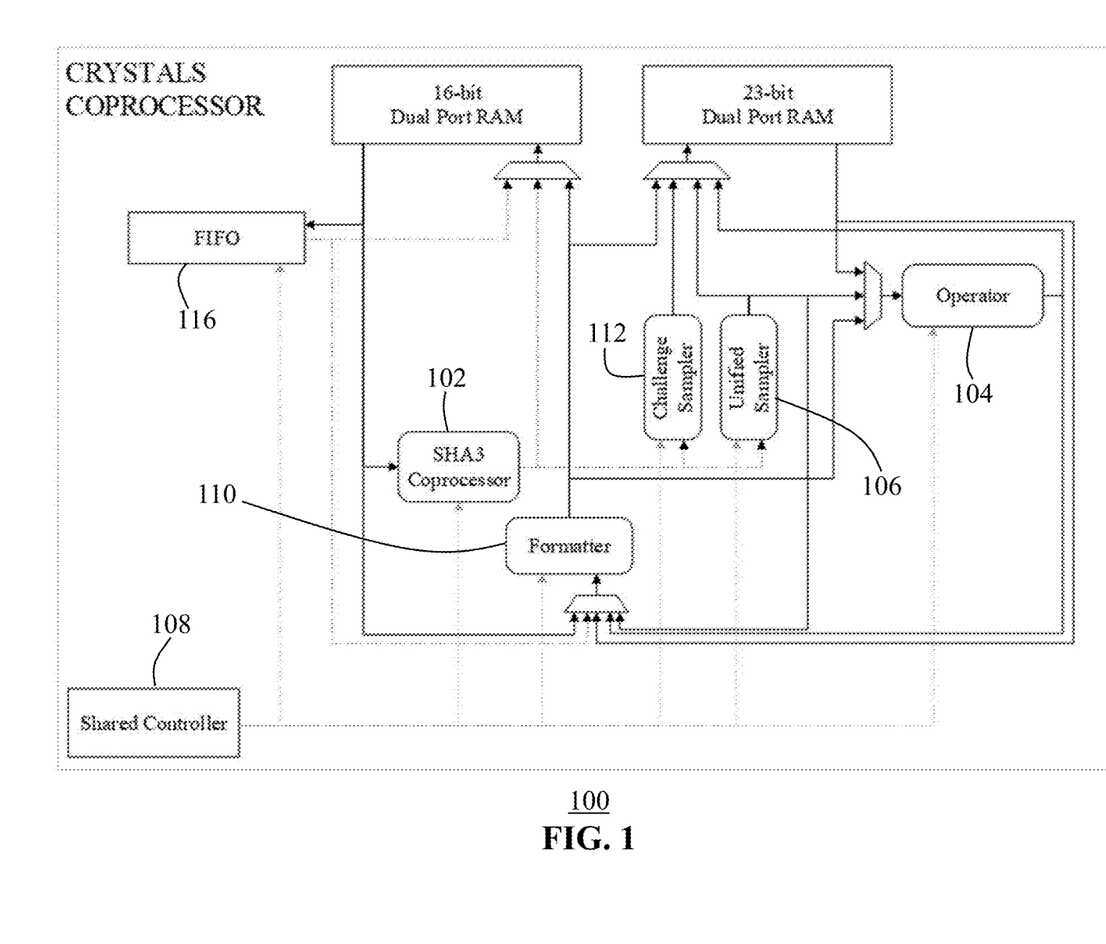
FIG. 1 is a diagram depicting the architecture of a combined CRYSTALS coprocessor.

With reference first to FIG. 1., the low footprint architecture 100 with its major subcomponents and their interconnection is displayed. As seen in FIG. 1, the SHA3 coprocessor 102 may take input from the 16-bit RAM as well as the FIFO interface 116 and places its result into the 16-bit RAM or feeds it into the Challenge Sampler 112 or Unified Sampler 106. The output of the Challenge sampler 112 is placed into the 23-bit RAM and the output of the unified sampler 106 is either placed into 23-bit RAM or fed directly to the Operator 104. In the case of Dilithium-DSA secret sampling, it is also fed to the formatter 110 to be packed. The Operator may also receive input from the 23-bit RAM, or from the formatter 110 as it unpacks encoded polynomials. The result is either stored in 23-bit RAM or fed into the formatter 110 to be packed. Additionally, the formatter 110 takes input from the 16-bit RAM and from the FIFO interface 116, and may store its result in either RAM. The Shared Controller 108 may manage the operation modes and timing of all submodules.

Therefore, as seen in FIG. 1, a low footprint resource sharing hardware architecture 100 is implemented as a co-processor 102 and is operably configured to perform a plurality of cryptographic algorithms for Dilithium-DSA at all NIST-recommended post-quantum cryptography security levels and a plurality of cryptographic algorithms for Kyber-KEM at all NIST-recommended post-quantum cryptography security levels. The architecture 100 may beneficially include a singular arithmetic unit 104 operably configured perform all arithmetic operations required in the plurality of cryptographic algorithms for Kyber-KEM and the plurality of cryptographic algorithms for Dilithium-DSA.

The architecture also beneficially includes a singular sampling unit 106 operably configured to sample all vectors and matrices required in the plurality of cryptographic algorithms for Kyber-KEM and the plurality of cryptographic algorithms for Dilithium-DSA. In one embodiment, the singular sampling unit 106 is also beneficially and operably configured to perform binomial sampling and rejection sampling for the all NIST-recommended post-quantum cryptography security levels, as required, in the plurality of cryptographic algorithms for Dilithium-DSA and in the plurality of cryptographic algorithms for Kyber-KEM.

Figure 2:
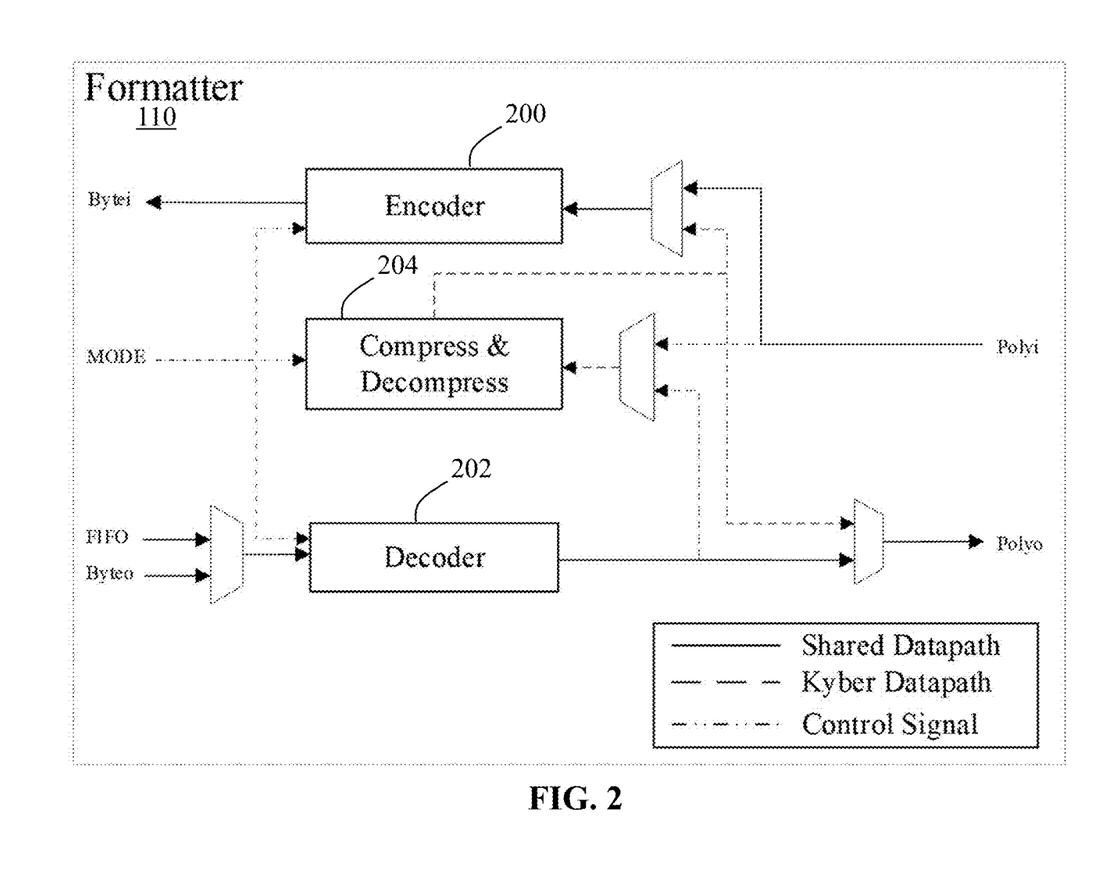
FIG. 2 is a diagram depicting the architecture of the shared formatter.

With reference to FIG. 2, an exemplary but preferred layout of the Formatter 110 depicted in FIG. 1 is shown. With reference to both FIGS. 1-2, the Formatter 110 may include or contain two different types of data paths, i.e., one used only by Kyber-KEM which utilizes the Compress & Decompress module 204, and one utilized by both Kyber-KEM and Dilithium-DSA which utilizes the Encoder module 200 and Decoder module 202. The Encoder and Decoder modules 200, 200 support encoding levels for both Kyber-KEM and Dilithium-DSA. The MODE of operation may be beneficially managed by the Shared Controller 108.

The internal hardware controller or Shared Controller 108 may have a specialized instruction ordering operably configured to minimize memory utilization within the architecture. Said another way, the internal hardware controller 108 may beneficially have a specialized instruction ordering operably configured to minimize a required memory range of a 16-bit RAM and a 23-bit RAM resident within the architecture 100. The internal hardware controller 108 may also be beneficially operably configured to perform the plurality of cryptographic algorithms for Kyber-KEM and the plurality of cryptographic algorithms for Dilithium-DSA.

As seen best in FIG. 2, the formatter 110 has a singular encoder 200, a singular decoder 202, and a singular combined compression and decompression module 204 operably configured to convert all polynomials, in the plurality of cryptographic algorithms for Kyber-KEM and in the plurality of cryptographic algorithms for Dilithium-DSA, between a packed form and an unpacked form. In preferred embodiments, a singular encoder 200 is operably configured to encode polynomial coefficients to a byte stream in the plurality of cryptographic algorithms for Dilithium-D SA at the all NIST-recommended post-quantum cryptography security levels and in the plurality of cryptographic algorithms for Kyber-KEM at the all NIST-recommended post-quantum cryptography security levels. Contrastingly, a singular decoder 200 is also operably configured to decode polynomial coefficients from a byte stream in the plurality of cryptographic algorithms for Dilithium-DSA at the all NIST-recommended post-quantum cryptography security levels and in the plurality of cryptographic algorithms for Kyber-KEM at the all NIST-recommended post-quantum cryptography security levels.

Figure 3:
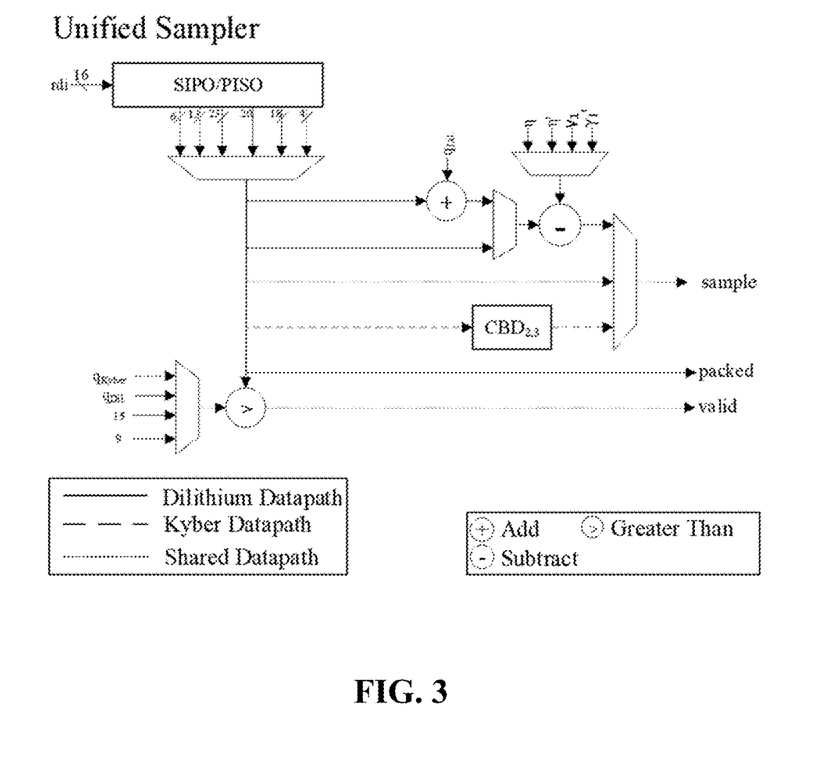
FIG. 3 is a diagram depicting the architecture of the shared sampler module.

With reference to FIG. 3, an exemplary layout of the Unified Sampler 106 depicted in FIG. 1 is shown. The Unified Sampler 106 includes or may contains data paths used by Kyber-KEM, Dilithium-DSA, and both algorithms. The Unified Sampler 106 supports CBD sampling, rejection sampling for Kyber-KEM and Dilithium-DSA and can generate centered values when required by Dilithium-DSA.

Figure 4:
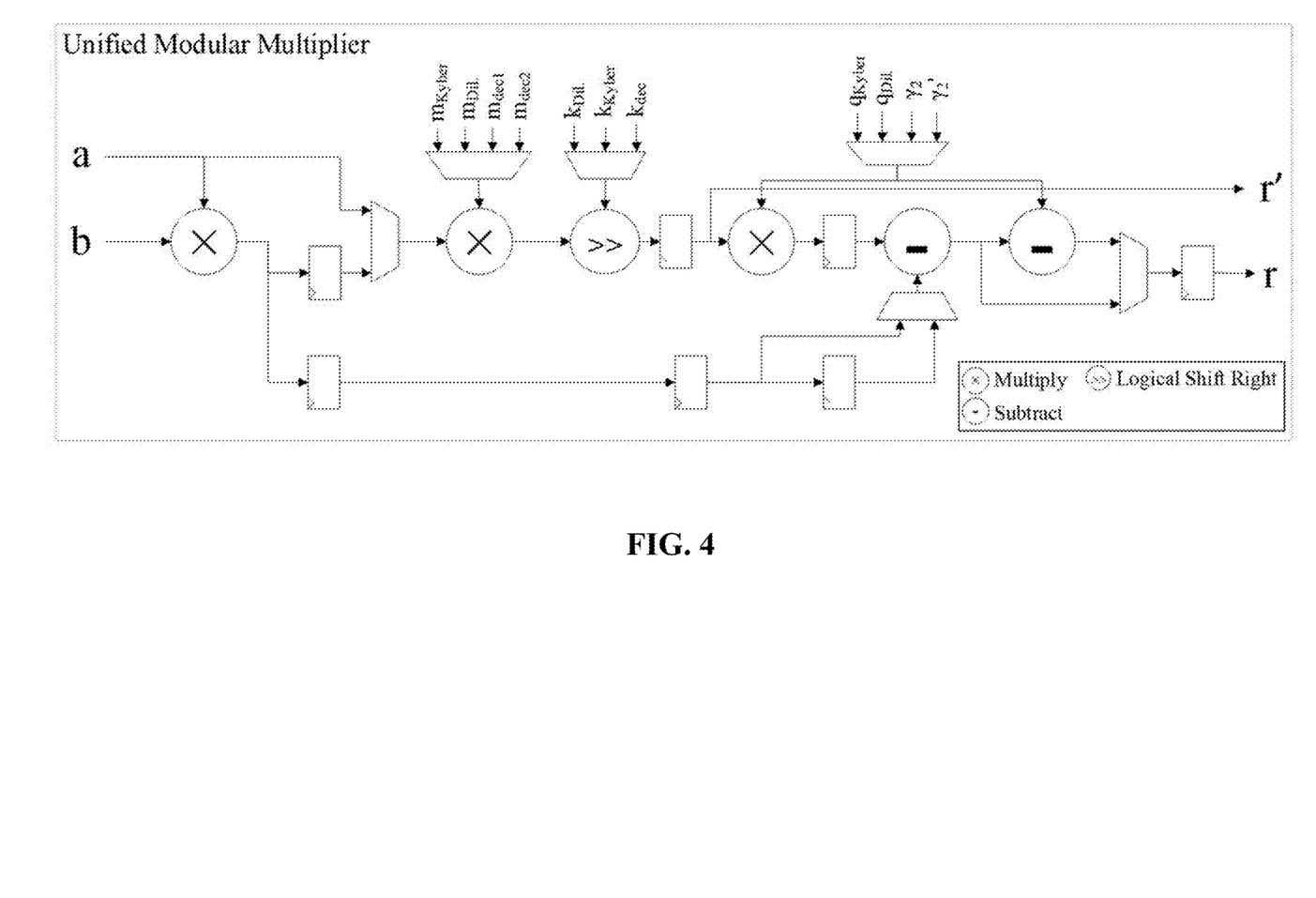
FIG. 4 is a diagram depicting the architecture of the shared modular multiplier.

With reference to FIG. 4, an exemplary layout of the Unified Modular Multiplier is shown. The Unified Modular Multiplier supports four operation modes, i.e., a modular multiplication for Kyber-KEM, a modular multiplication for Dilithium-DSA, a decomposition for level 2 for Dilithium-DSA, and a decomposition for levels 3,4 for Dilithium-DSA. FIG. 4 depicts how three multipliers, a barrel shifter, and two subtractors are beneficially reused to perform all four operation modes.

In one embodiment and with reference to FIG. 1 and FIG. 4, the singular arithmetic unit 104 also includes a singular unified or pipelined modular multiplier operably configured to perform modular multiplication for a modulus value of the plurality of cryptographic algorithms for Kyber-KEM, a modulus value of the plurality of cryptographic algorithms for Dilithium-DSA, and a decomposition for the all NIST-recommended post-quantum cryptography security levels of the plurality of cryptographic algorithms for Dilithium-DSA. In one embodiment, the singular unified modular multiplier is operably configured to perform, within the singular unified modular multiplier, the modular multiplication and the decomposition for the all NIST-recommended post-quantum cryptography security levels of the plurality of cryptographic algorithms for Dilithium-DSA utilizing three multipliers, a singular right shift, and two subtractors.

Figure 5:
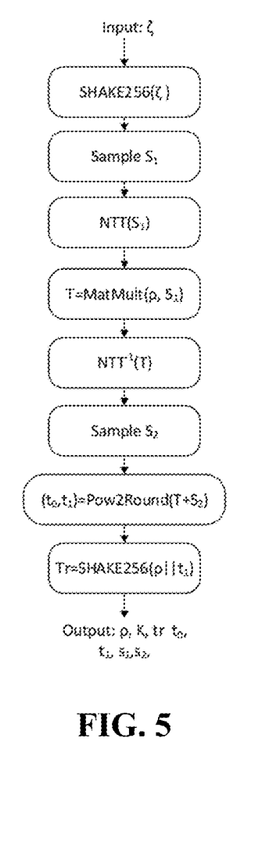
FIG. 5 is a diagram depicting exemplary instruction ordering and for Dilithium-DSA key generation.
Figure 6:
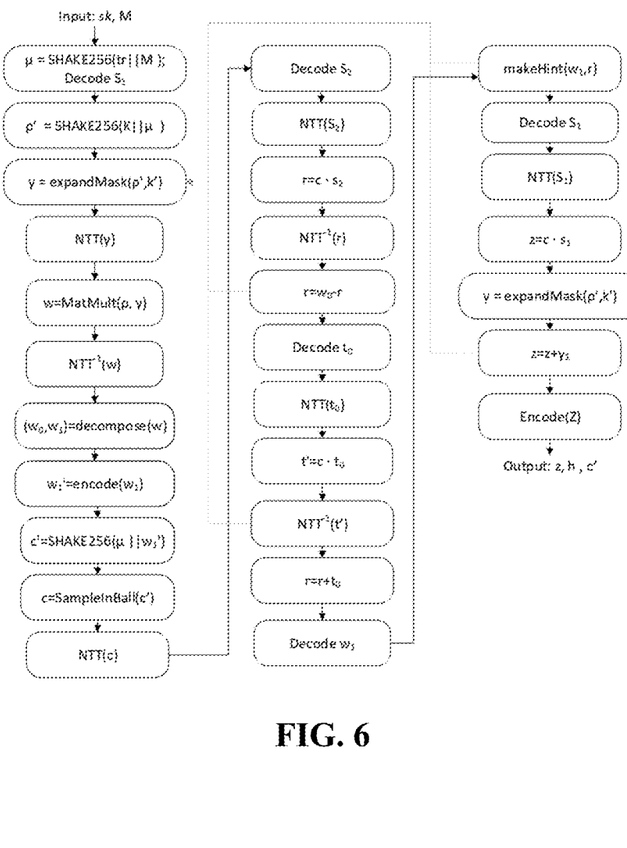
FIG. 6 is a diagram depicting the instruction ordering for Dilithium-DSA signature generation.
Figure 7:
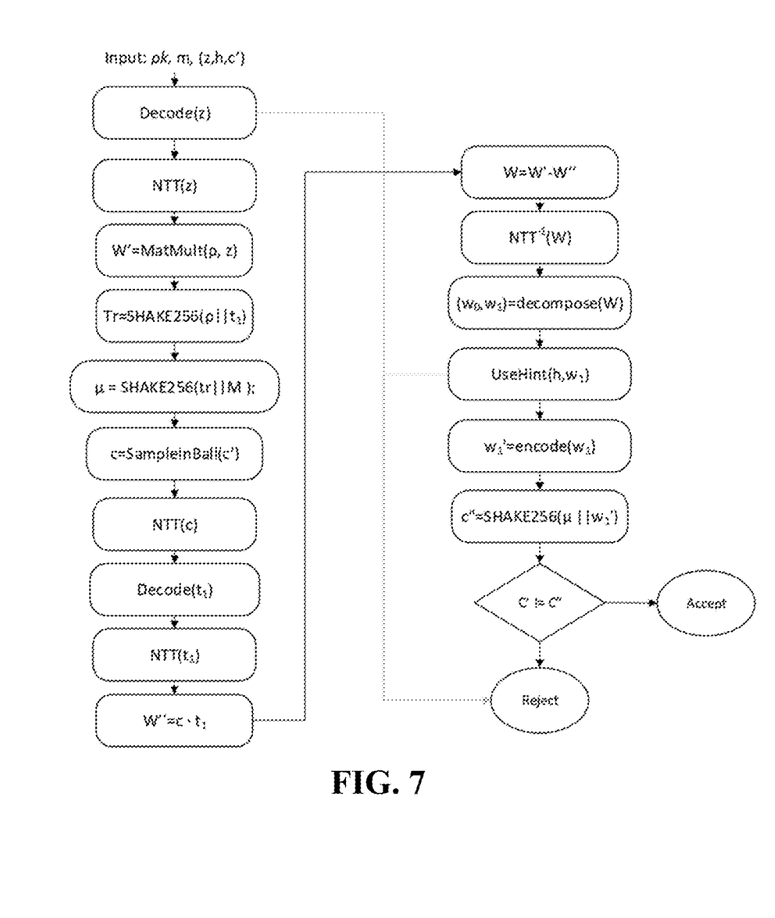
FIG. 7 is a diagram depicting the instruction ordering for Dilithium-DSA signature verification.

With reference to FIGS. 5-7, exemplary ordering of instructions used to minimize memory utilization is described. These flowcharts describe the ordering of operations used to minimize the memory required for operation. In particular they describe the ordering for Dilithium-DSA since it has substantially higher memory requirements than Kyber-KEM. When polynomials are in their encoded form they are stored in the 16-bit RAM, when they are in their decoded form they are in 23-bit RAM. This ordering is optimized so no more than two vectors and one singular polynomial are in their larger, decoded form at any given time.

Figure 8:
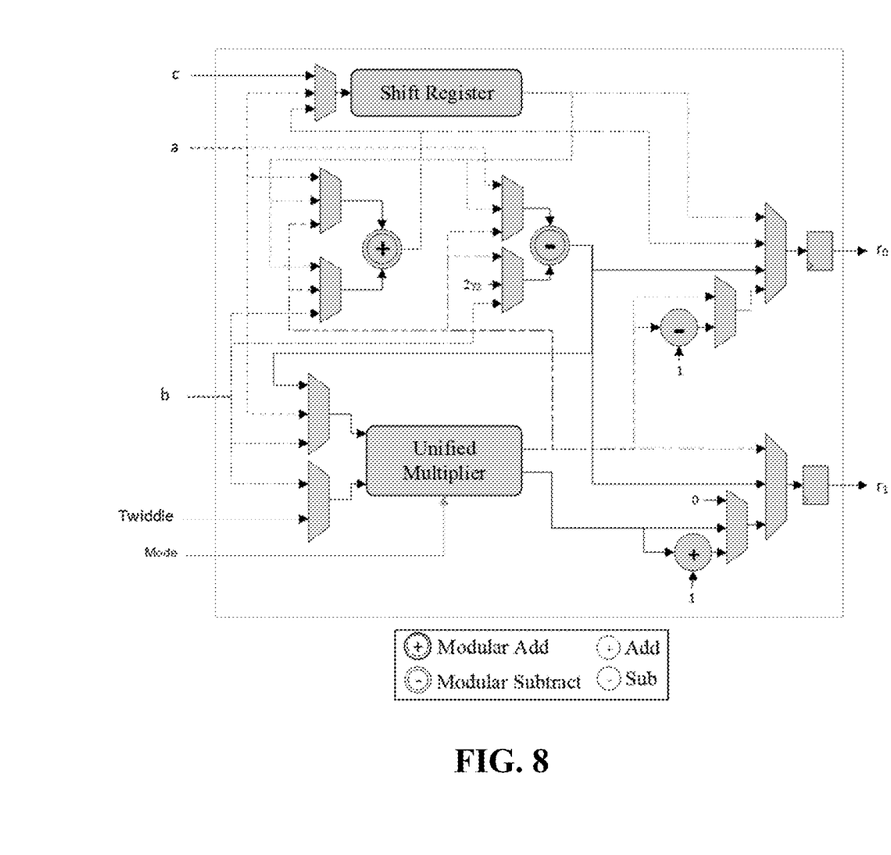
FIG. 8 is a diagram depicting an exemplary singular hardware module utilized in an operator unit in accordance with one embodiment of the present invention.

With reference to FIG. 1 and FIG. 8, the singular arithmetic unit 104 may also include a singular hardware module operably configured to perform modular addition, modular subtraction, modular multiplication, degree 1 polynomial multiplication, a Cooley-Tukey butterfly operation, a Gentlemen-Sande butterfly operation, and a decomposition, as required, for both an algebraic module utilized in the plurality of cryptographic algorithms for Kyber-KEM and an algebraic module utilized in the plurality of cryptographic algorithms for Dilithium-DSA.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. A low footprint resource sharing hardware architecture implemented as a co-processor and operably configured to perform a plurality of cryptographic algorithms for Dilithium-DSA at all NIST-recommended post-quantum cryptography security levels and a plurality of cryptographic algorithms for Kyber-KEM at all NIST-recommended post-quantum cryptography security levels and having:
a singular arithmetic unit operably configured to perform all arithmetic operations required in the plurality of cryptographic algorithms for Kyber-KEM and the plurality of cryptographic algorithms for Dilithium-DSA;
a singular sampling unit operably configured to sample all vectors and matrices required in the plurality of cryptographic algorithms for Kyber-KEM and the plurality of cryptographic algorithms for Dilithium-DSA; and
an internal hardware controller having a specialized instruction ordering scheme operably configured to manage operation modes and timing of both the singular arithmetic unit and the singular sampling unit.

2. The low footprint resource sharing hardware architecture according to claim 1, wherein the singular arithmetic unit further comprises:
a singular hardware module operably configured to perform modular addition, modular subtraction, modular multiplication, degree 1 polynomial multiplication, a Cooley-Tukey butterfly operation, a Gentlemen-Sande butterfly operation, and a decomposition, as required, for both an algebraic module utilized in the plurality of cryptographic algorithms for Kyber-KEM and an algebraic module utilized in the plurality of cryptographic algorithms for Dilithium-DSA.

3. The low footprint resource sharing hardware architecture according to claim 2, wherein the singular arithmetic unit further comprises:
a singular unified modular multiplier operably configured to perform modular multiplication for a modulus value of the plurality of cryptographic algorithms for Kyber-KEM, a modulus value of the plurality of cryptographic algorithms for Dilithium-DSA, and a decomposition for the all NIST-recommended post-quantum cryptography security levels of the plurality of cryptographic algorithms for Dilithium-DSA.

4. The low footprint resource sharing hardware architecture according to claim 3, wherein:
the singular unified modular multiplier is operably configured to perform, within the singular unified modular multiplier, the modular multiplication and the decomposition for the all NIST-recommended post-quantum cryptography security levels of the plurality of cryptographic algorithms for Dilithium-DSA utilizing three multipliers, a singular right shift, and two subtractors.

5. The low footprint resource sharing hardware architecture according to claim 1, further comprising:
an internal hardware controller having a specialized instruction ordering scheme operably configured to minimize memory utilization within the architecture.

6. The low footprint resource sharing hardware architecture according to claim 1, further comprising:
an internal hardware controller having a specialized instruction ordering scheme operably configured to minimize a required memory range of a 16-bit RAM and a 23-bit RAM resident within the architecture.

7. The low footprint resource sharing hardware architecture according to claim 1, further comprising:
an internal hardware controller operably configured to perform the plurality of cryptographic algorithms for Kyber-KEM and the plurality of cryptographic algorithms for Dilithium-DSA.

8. The low footprint resource sharing hardware architecture according to claim 1, further comprising:
a formatter having a singular encoder, a singular decoder, and a singular combined compression and decompression module operably configured to convert all polynomials, in the plurality of cryptographic algorithms for Kyber-KEM and in the plurality of cryptographic algorithms for Dilithium-DSA, between a packed form and an unpacked form.

9. The low footprint resource sharing hardware architecture according to claim 8, wherein:
the singular encoder is operably configured to encode polynomial coefficients to a byte stream in the plurality of cryptographic algorithms for Dilithium-DSA at the all NIST-recommended post-quantum cryptography security levels and in the plurality of cryptographic algorithms for Kyber-KEM at the all NIST-recommended post-quantum cryptography security levels.

10. The low footprint resource sharing hardware architecture according to claim 8, wherein:
the singular decoder is operably configured to decode polynomial coefficients from a byte stream in the plurality of cryptographic algorithms for Dilithium-DSA at the all NIST-recommended post-quantum cryptography security levels and in the plurality of cryptographic algorithms for Kyber-KEM at the all NIST-recommended post-quantum cryptography security levels.

11. The low footprint resource sharing hardware architecture according to claim 1, wherein:

the singular sampling unit operably configured to perform binomial sampling and rejection sampling for the all NIST-recommended post-quantum cryptography security levels, as required, in the plurality of cryptographic algorithms for Dilithium-DSA and in the plurality of cryptographic algorithms for Kyber-KEM.

12. The low footprint resource sharing hardware architecture according to claim 1, further comprising:
an FIFO module, a SHA3 coprocessor, two dual port RAM modules, a formatter module, a sampler module, a challenge sampler module, and an operator module, the internal hardware controller having the specialized instruction ordering scheme operably configured to manage operation modes and timing of the FIFO module, the SHA3 coprocessor, the two dual port RAM modules, the formatter module, the sampler module, the challenge sampler module, and the operator module.

13. A low footprint resource sharing hardware architecture implemented as a co-processor and operably configured to perform a plurality of cryptographic algorithms for Dilithium-DSA at all NIST-recommended post-quantum cryptography security levels and a plurality of cryptographic algorithms for Kyber-KEM at all NIST-recommended post-quantum cryptography security levels and having:
a singular arithmetic unit operably configured to perform all arithmetic operations required in the plurality of cryptographic algorithms for Kyber-KEM and the plurality of cryptographic algorithms for Dilithium-DSA;
a singular sampling unit operably configured to sample all vectors and matrices required in the plurality of cryptographic algorithms for Kyber-KEM and the plurality of cryptographic algorithms for Dilithium-DSA; and
an internal hardware controller having a specialized instruction ordering scheme operably configured to minimize a required memory range of a 16-bit RAM and a 23-bit RAM resident within the architecture.

14. A low footprint resource sharing hardware architecture implemented as a co-processor and operably configured to perform a plurality of cryptographic algorithms for Dilithium-DSA at all NIST-recommended post-quantum cryptography security levels and a plurality of cryptographic algorithms for Kyber-KEM at all NIST-recommended post-quantum cryptography security levels and having:
a singular arithmetic unit operably configured to perform all arithmetic operations required in the plurality of cryptographic algorithms for Kyber-KEM and the plurality of cryptographic algorithms for Dilithium-DSA;
a singular sampling unit operably configured to sample all vectors and matrices required in the plurality of cryptographic algorithms for Kyber-KEM and the plurality of cryptographic algorithms for Dilithium-DSA; and
a formatter, having a singular encoder, a singular decoder, and a singular combined compression and decompression module, operably configured to convert all polynomials, in the plurality of cryptographic algorithms for Kyber-KEM and in the plurality of cryptographic algorithms for Dilithium-DSA, between a packed form and an unpacked form.

* * * * *